US006495748B1

(12) United States Patent
Wang et al.

(10) Patent No.: US 6,495,748 B1
(45) Date of Patent: Dec. 17, 2002

(54) SYSTEM FOR ELECTRONICALLY EMULATING MUSICAL INSTRUMENT

(75) Inventors: Chung-Tsan Wang, Keelung; Jin-Sheng Liou, Sanchong; Lung-Shuai Wu, Taichung, all of (TW)

(73) Assignee: Behavior Tech Computer Corporation, Taipei (TW)

( * ) Notice: Subject to any disclaimer, the term of this patent is extended or adjusted under 35 U.S.C. 154(b) by 131 days.

(21) Appl. No.: 09/900,904

(22) Filed: Jul. 10, 2001

(51) Int. Cl.[7] .................................................. G01P 3/00
(52) U.S. Cl. .......................................... 84/658; 811/745
(58) Field of Search ........................... 84/645, 658, 745

(56) References Cited

U.S. PATENT DOCUMENTS

| | | | | | |
|---|---|---|---|---|---|
| 3,708,605 | A | * | 1/1973 | Ohno | |
| 3,943,812 | A | * | 3/1976 | Nagai et al. | |
| 4,044,642 | A | * | 8/1977 | Pearlman et al. | |
| 5,331,111 | A | * | 7/1994 | O'Connell | 84/645 X |
| 5,389,729 | A | * | 2/1995 | Hiramatsu | |
| 5,488,196 | A | * | 1/1996 | Zimmerman et al. | |
| 5,565,641 | A | * | 10/1996 | Gruenbaum | 84/645 X |
| 5,646,648 | A | * | 7/1997 | Bertram | |
| 5,670,729 | A | * | 9/1997 | Miller et al. | |
| 5,739,455 | A | * | 4/1998 | Poon | |
| 5,777,251 | A | * | 7/1998 | Hotta et al. | |
| 5,971,635 | A | * | 10/1999 | Wise | |
| 6,063,994 | A | * | 5/2000 | Kew et al. | |
| 6,066,795 | A | * | 5/2000 | Hara | 84/645 |
| 6,133,517 | A | * | 10/2000 | Masubuchi | |

* cited by examiner

*Primary Examiner*—Jeffrey Donels
(74) *Attorney, Agent, or Firm*—Rosenberg, Klein & Lee

(57) ABSTRACT

This invention relates to a multimedia instrument simulation device and methods. The device is connected to a multimedia keyboard or computer and comprises several playing elements that simulate the playing of musical instruments. In conjunction with one signal acquisition element, the playing elements individually perform plucking, pressing, or striking actions, while retrieving the corresponding linearly varying analog signal. After conversion and processing in one signal pickup circuit, the signals are directly transmitted to a multimedia keyboard or sent to a PC for further simulation and processing via an interface circuit. After comparing the instrument playing digital data retrieved and converted by the aforementioned simulation device with the standard sound length, tone, and volume of the same instruments stored in a PC, the identical sound length, tone, and volume instrument playing sound effects data is outputted to playing equipment for playing. This process provides real-time simulated output of sound effects identical to the actual sound length, tone, and volume of playing elements.

10 Claims, 3 Drawing Sheets

SYSTEM FOR ELECTRONICALLY EMULATING MUSICAL INSTRUMENT

FIELD OF THE INVENTION

This invention relates to a multimedia instrument simulation device and methods, in particular to a multimedia instrument playing sound effect simulation output device and methods used in conjunction with a computer.

BACKGROUND OF THE INVENTION

Multimedia computers are widely used for processing and outputting of multimedia images and sound effects. In particular, the rapid development of the music simulation software and program technology used in multimedia computers has enabled functionality not limited to the processing and control of sound effects. For instance, music or sound effects production programs provide simulated instrument composition or input functions for such instruments as guitar, piano, and drums. Nevertheless, when the simulated playing of multimedia instruments is performed, a computer keyboard must serve as the chief input to the simulation device. This is to say that, among the instrument playing components, the operation of the guitar strings, piano keys and drumhead must be simulated by pressing the alphanumeric keys of the computer keyboard. In addition, the volume and tone can be adjusted only by pressing various function keys. This approach makes operation complex and inconvenient. Besides making operation difficult, because it cannot give users the feeling of actually playing an instrument, the approach tends to result in poor performance.

The main objective of the invention is to provide a multimedia instrument simulation device and method which generates electrical signals corresponding to the level of the instrument play in order to enable a PC to produce lifelike simulated playing effects with accurate sound length, tone, and volume.

A further objective of the invention is to provide a multimedia instrument simulation device and methods, so that the playing of instruments and simulation operation do not require the simultaneous use of any keyboard keys. Playing will thus be as convenient as the playing of ordinary instruments.

Another objective of the invention is to provide a multimedia instrument simulation device and methods which can deliver realistic effects by retrieving with complete accuracy the analog signals corresponding to the force with which the player plays the instrument and the sound length, tone, and volume controlled by the player, and outputting in real-time sound effects with identical sound length, tone, and volume following conversion and processing.

Therefore, the invention is connected to a multimedia keyboard or computer, and contains several playing elements that simulate the playing of instruments. In conjunction with one signal acquisition element, the playing elements perform individually perform plucking, pressing, or striking actions, while retrieving the corresponding linearly varying analog signal. After conversion and processing in one signal pickup circuit, the signals are directly transmitted to a multimedia keyboard or sent to a PC for further simulation and processing via an interface circuit. After comparing the instrument playing digital data retrieved and converted by the aforementioned simulation device with the standard sound length, tone, and volume of the same instruments stored in a PC, the identical sound length, tone, and volume instrument playing sound effects data is outputted to playing equipment for playing. This process provides real-time simulated output of sound effects identical to the actual sound length, tone, and volume of playing elements, achieving the goal of giving a highly lifelike sensory effects.

Figure 1:
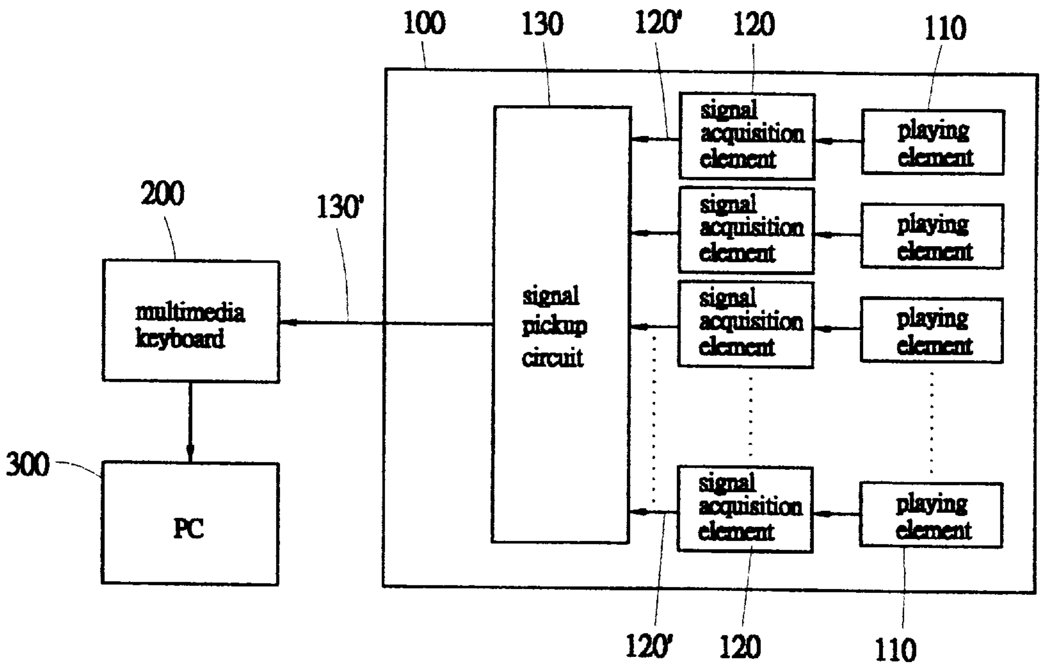
FIG. 1 is a block diagram of the circuit of the invention.

Please refer to FIG. 1, the multimedia instrument simulation device of this invention (henceforth referred to as instrument simulation device) is indicated by 100 in all figures. The embodiment shown in FIG. 1 is connected to a multimedia keyboard 200. Instrument simulation device 100 comprises several series of playing elements 110 and signal acquisition elements 120. There is no restriction on the form of the playing elements 110, which constitute instrument operating elements such as guitar strings, piano keys or drumheads, etc. The signal acquisition elements 120 are used to connect to playing elements 110. Whenever a playing element 110 is plucked, pressed, or struck, a signal acquisition element produces analog signals 120' corresponding to the plucked guitar string, pressed piano key, or struck drumhead. As for the acquisition method of the signal acquisition elements 120, relative changes in resistance, inductance, or capacitance can be used to generate analog transformations in an electrical signal. With respect to the detailed principles of this process, the application approaches listed in the following text for reference and comparison provide a description.

The instrument simulation device 100 further comprises a signal pickup circuit 130, which performs analog/digital conversion and processing of analog signal 120' simultaneous with and corresponding to the intensity of the operation of playing element 110 and acquired by means of resistance, inductance, or capacitance changes. The analog signal is immediately converted to digital numerical data output 130' and serves as input to multimedia keyboard 200, in which it replaces the original instrument playing by means of alphanumeric or function keys The multimedia keyboard 200 sends the digital data 130', representing the playing of instruments, to PC 300 for further sound effect simulation and processing.

Figure 2:
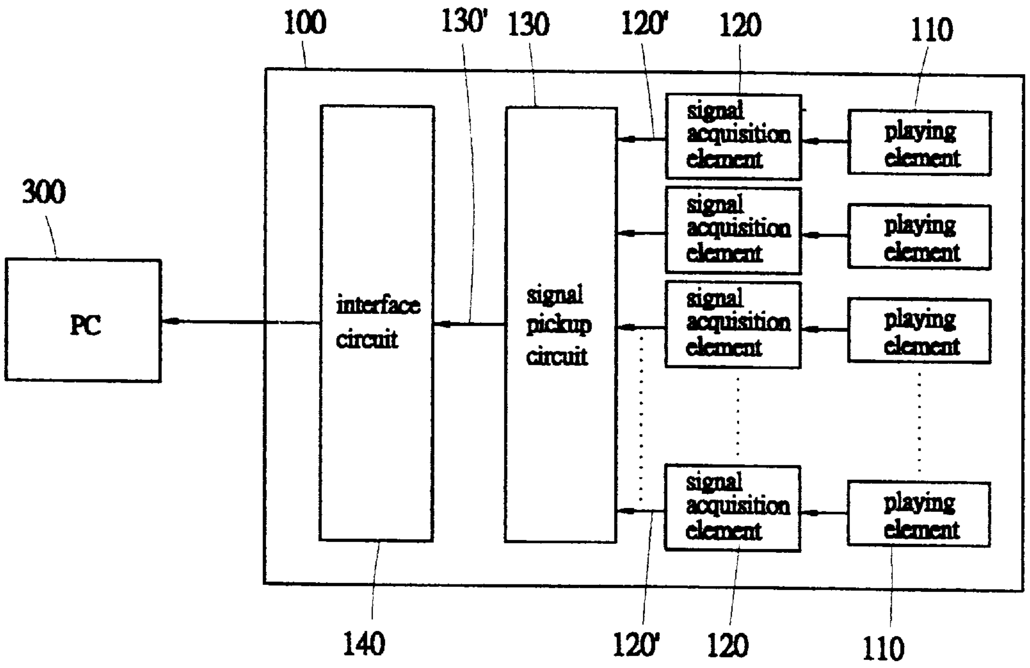
FIG. 2 shows another embodiment of the invention.

FIG. 2 shows another embodiment of the instrument simulation device 100 of the inventions no different from that shown in FIG. 1. The only difference between FIG. 1 and FIG. 2 is that the signal pickup circuit 130 uses an interface circuit 140 to send the digital data 130' directly to PC 300 after converting output digital data 130'. This allows PC 300 to directly perform simulation and processing of the sound effects output. The difference between the applications shown in FIG. 1 and FIG. 2 is that the architecture in FIG. 1 directly attaches instrument simulation device 100 with multimedia keyboard 200, making it a multimedia keyboard worthy of the name. In contrast, in light of the bulk of the instrument simulation device 100, making it inappropriate to directly attach it to multimedia keyboard 200, another appropriate approach is shown in FIG. 2.

Figure 3:
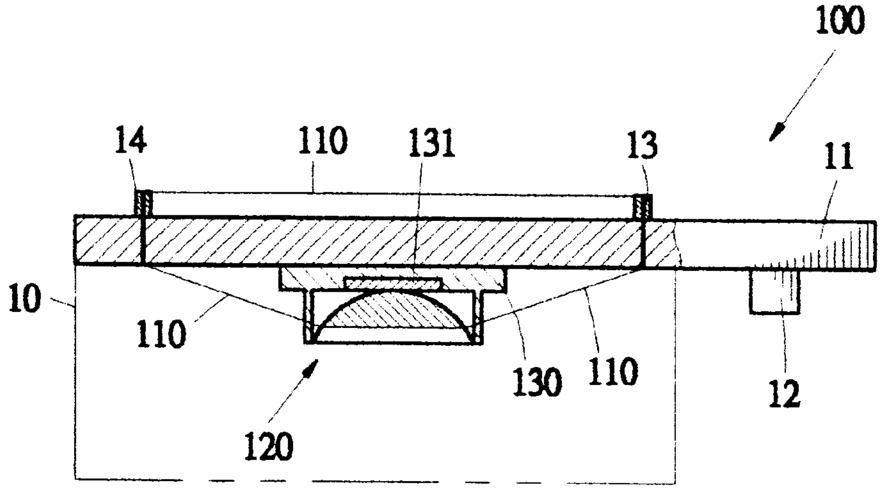
FIG. 3 is a cross sectional view of an actual application of this invention.

FIG. 3 shows an application of this invention . A guitar is used for the embodiment. The instrument simulation device 100 includes a case 10, which is not limited to any particularly shape or form. On one end of the case are installed one signal connector 11 and a flexible protruding plate 12 (see FIG. 3), which facilitates a plug-in connection with multimedia keyboard 200 or PC 300. The playing element 110 is installed on the outside of case 10, and on its two ends are mounted fastening rings 13 and 14. Fastening rings 13 and 14 fasten playing element 110 and enable playing element 110 to open out after passing through the inside and outside of case 10, allowing flexible expansion.

The signal acquisition element 120 and the signal pickup circuit 13 are located in the case 10 in a position above playing element 110. This embodiment of signal acquisition element 120 is made of conducting rubber, which will return to its original shape after deformation. One end of signal acquisition element 120 is connected to playing element 110, while the surface of the other end is in contact with the surface of signal pickup circuit 130. When playing element 110 is plucked, it exerts compressive force, causing signal acquisition element 120 to compress in direct proportion to the strength of the applied force in the direction of signal pickup circuit board 130. The number of signal acquisition elements 126 connected to each playing element 110 is not restricted, and in the application shown in FIG. 3 there are signal acquisition elements 120 in the front, center, and rear to better explain the embodiment. Because playing element 110 is in the form of a guitar string, the tone it produces can be controlled by pressing it down at different places. Several series of carbon film resistance plates 131 of any form are mounted on the surface of signal pickup circuit 130. As shown in FIG. 3, the carbon film resistance plates 131 are elongated printed carbon film resistors which separately make contact with one end of the signal acquisition elements 120. The end of signal acquisition elements 120 making contact is hemispheric in shape. When playing element 110 has not been plucked, the area of contact with carbon film resistance plates 131 is at a minimum, and is only a small point. At this time the electric current flowing through carbon film resistance plates 131 or the circuit connected with them will be at a minimum. We have defined this as the initial, undisturbed state.

Figure 4:
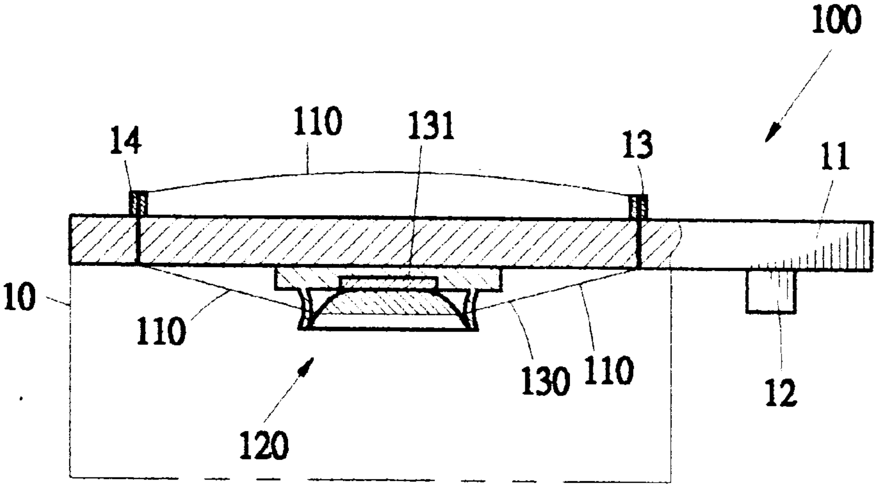
FIG. 4 is a cross sectional view similar to FIG. 3, but showing how the signal retrieval element is compressed and deforms when the playing element in the form of guitar strings is plucked.

Please refer to FIGS. 3 and 4, the instrument simulation device 100 causes the signal acquisition elements 120 corresponding to and attached to playing element 110 to deform in a manner that is completely in proportion to the amount of applied plucking force when the application is being operated. In this case the plucking of playing element 110 is the same as the plucking of normal guitar strings. The deformation of signal acquisition elements 120 thus reflects the intensity of the plucking of the guitar strings and controls the volume. The amount of deformation of each signal acquisition element 40 will be slightly different depending on where the user's finger presses down on playing element 110, which serves to control tone in the same way that the position of a player's fingers pressing on guitar strings controls the tone. The deformation of signal acquisition elements 120 causes the area of contact between the carbon film resistance plates 131 on that signal pickup circuit 130 and the hemispherical ends of signal acquisition elements 120 to vary, and the area will invariably be larger than the original area of contact. In accordance with Ohm's law, the resistance is inversely proportional with the area of the conductor. Increased area of contact will thus cause the electric current flowing through carbon film resistance plates 131 or the connected circuit to increase in a proportional manner. We can the convert the linearly varying analog signal 120' into digital data 130' via signal pickup circuit 130, and transmit the resulting data via a signal connector 11 to a multimedia keyboard 200 or a PC 300, allowing PC 300 to generate the corresponding sound length, tone, and volume, and produce simulated output.

Figure 5:
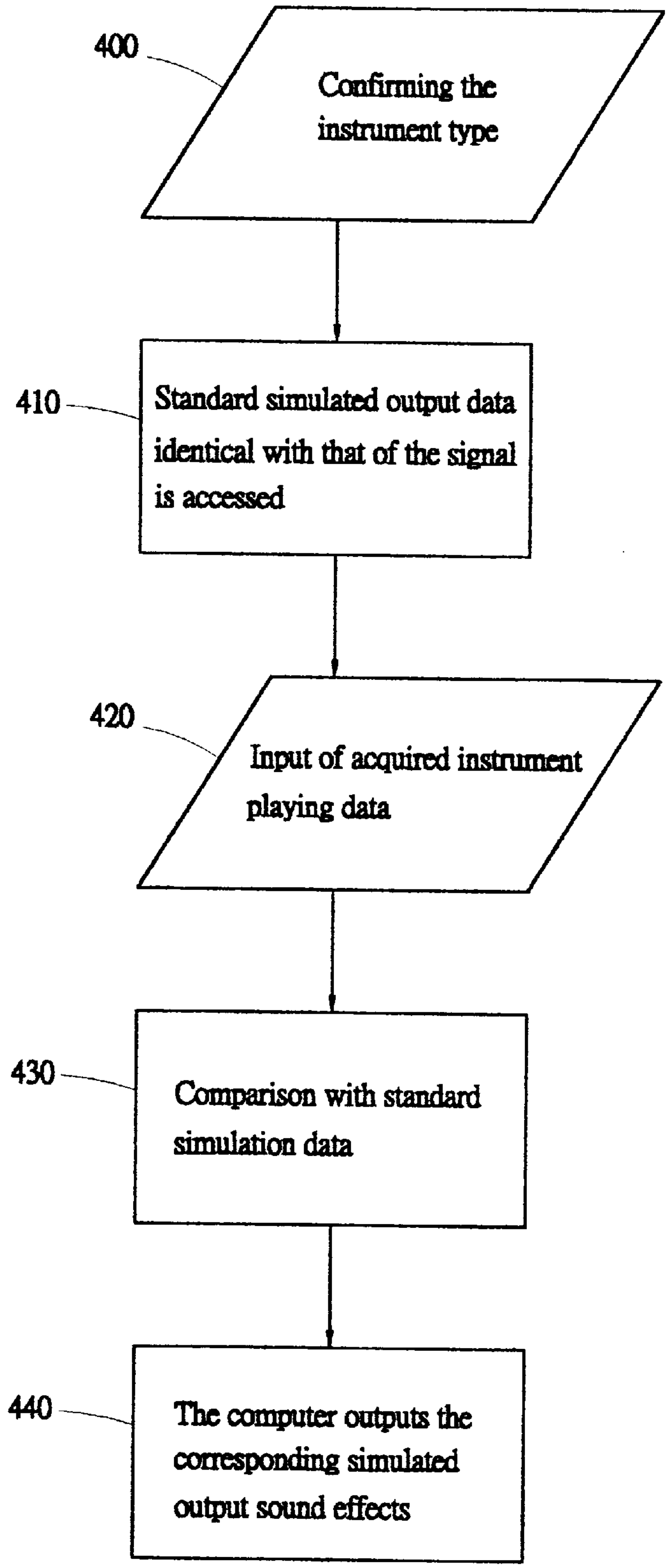
FIG. 5 is a flow diagram of the method of the invention.

FIG. 5 shows a flow diagram of the multimedia instrument simulation method employed by this invention. The method comprises the following steps:

(400) Confirming the instrument type: PC 300 can select the instrument it is desired to simulate from multimedia keyboard 200 or the above-mentioned instrument simulation device 100.

(410) Standard simulated output data identical with that of the instrument is accessed. This data consists of standard simulated sound effects data stored on PC 300.

(420) Input of acquired instrument playing data: This is digital data 130' from the instrument simulation device 100 and reflects actual playing.

(430) Comparison with standard simulation data: The computer locates identical or similar standard simulated output data.

(440) The computer outputs the corresponding simulated output sound effects: After the computer has located'standard simulated sound effect output data with sound length, tone, and volume identical with or similar to those of the playing of actual instruments in step (430), the data is sent as output to a loudspeaker or sound effects playing equipment. The above steps can rely on a sound effects program stored in PC 300. After the computer has acquired digital data 130' with sound length, tone, and volume identical with those of actual playing from instrument simulation device 100, the data can be rapidly processed to serve as the most appropriate, synchronous real-time simulated sound effects output, giving the player a very realistic playing experience.

What is claimed is:

1. A system for electronically emulating a musical instrument comprising:

at least one playing element having a predetermined configuration, said predetermined configuration simulating a sound actuating portion of a preselected musical instrument at least a portion of said playing element being mechanically modulated responsive to user actuation thereof;

at least one signal acquisition element coupled to said playing element said signal acquisition element including at least one deflection member adaptively deflectable responsive to the mechanical modulation of said playing element to generate a correspondingly defined analog sound signal, said deflection member deflection corresponding in degree to said playing element mechanical modulation;

at least one signal pickup circuit coupled to said signal acquisition element for generating a digital sound signal responsive to said analog sound signal; and, a programmable control unit coupled to said signal pickup circuit for automatically processing said digital sound signal for generation of an audio signal corresponding to the mechanical modulation of said playing element.

2. The system for electronically emulating a musical instrument as recited in claim 1 further comprising a coupling member for coupling said signal acquisition element to said signal pickup circuit, said coupling member varying in a predetermined electrical parameter responsive to the degree of said signal acquisition element deflection member deflection.

3. The system for electronically emulating a musical instrument as recited in claim 2 wherein at least a portion of said deflection member of said signal acquisition element is formed of an elastic conductive rubber material.

4. The system for electronically emulating a musical instrument as recited in claim 3 wherein said coupling member includes at least one carbon film resistance plate, said carbon film resistance plate coupling said signal acquisition element to said signal pickup circuit in resistance variable manner.

5. The system for electronically emulating a musical instrument as recited in claim 1 wherein said playing element includes a plurality of tensioned string members for simulating a plurality of guitar strings.

6. The system for electronically emulating a musical instrument as recited in claim 1 comprising a plurality of said playing elements and said signal acquisition elements, said predetermined configurations of said playing elements being selected from the group consisting of: a guitar strings configuration, a piano keys configuration, and a drumhead configuration.

7. The system for electronically emulating a musical instrument as recited in claim 2 wherein said predetermined electrical parameter is selected from the group consisting of: resistance, inductance, capacitance, and an electro-optical parameter.

8. A method for electronically emulating a musical instrument comprising the steps of:

(a) establishing at least one playing element having a preselected configuration simulating a sound actuating portion of a predetermined musical instrument;

(b) establishing at least one signal acquisition element coupled to said playing element said signal acquisition element including at least one deflection member adaptively deflectable responsive to the mechanical modulation of said playing element for generating a correspondingly defined analog sound signal, said deflection member deflection corresponding in degree to said playing element mechanical modulation;

(c) establishing at least one signal pickup circuit coupled to said signal acquisition element for generating a digital sound signal responsive to said analog sound signal;

(d) establishing a programmable control unit coupled to said signal pickup circuit, said programmable control unit having stored therein a corresponding standard simulated output data set for each said predetermined configuration of said playing element;

(e) actuating a mechanical modulation of at least a portion of said playing element;

(f) automatically selecting one said standard simulated output data signal responsive to said playing element actuation; and, (g) automatically comparing said digital sound signal with said standard simulated output data set and generating an output sound signal responsive thereto.

9. The method for electronically emulating a musical instrument as recited in claim 8 wherein a plurality of said standard simulated output data sets are prestored in said programmable control unit.

10. The method for electronically emulating a musical instrument as recited in claim 9 wherein said standard simulated output data sets correspond respectively to a plurality of predetermined instrument types.

* * * * *